United States Patent
Shaffer et al.

(10) Patent No.: US 6,549,534 B1
(45) Date of Patent: Apr. 15, 2003

(54) APPARATUS AND METHOD FOR ACCESSING WIRELESS TRUNKS ON A COMMUNICATIONS NETWORK

(75) Inventors: Shmuel Shaffer, Palo Alto, CA (US); William Joseph Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/152,358

(22) Filed: Sep. 14, 1998

(51) Int. Cl.[7] .................. H04L 12/66; H04L 12/28; H04L 12/56; H04B 1/38; H04B 7/15; H04M 1/00
(52) U.S. Cl. .............. 370/355; 370/420; 455/11.1; 455/557
(58) Field of Search ................ 370/328, 338, 370/352–356, 389, 400–401, 464–467, 908, 913, 419–420, 421; 455/403, 422, 426, 11.1, 550, 557, 554, 555; 379/900

(56) References Cited

U.S. PATENT DOCUMENTS

| | | | |
|---|---|---|---|
| 4,825,457 A | | 4/1989 | Lebowitz |
| 5,020,090 A | | 5/1991 | Morris |
| 5,428,671 A | | 6/1995 | Dykes et al. |
| 5,526,403 A | | 6/1996 | Tam |
| 5,732,074 A | * | 3/1998 | Spaur et al. .............. 370/313 |
| 5,745,579 A | | 4/1998 | Newman |
| 5,771,459 A | * | 6/1998 | Demery et al. .......... 455/517 |
| 5,949,775 A | * | 9/1999 | Rautiola et al. .......... 370/401 |
| 6,208,627 B1 | * | 3/2001 | Menon et al. ............ 370/328 |
| 6,246,688 B1 | * | 6/2001 | Angwin et al. .......... 370/392 |
| 6,362,730 B2 | * | 3/2002 | Razavi et al. ............ 340/438 |
| 2002/0032789 A1 | * | 3/2002 | Bahren et al. ........... 709/230 |

FOREIGN PATENT DOCUMENTS

| | | |
|---|---|---|
| EP | 0 843 491 A2 | 5/1998 |
| WO | WO 95/01070 | 1/1995 |
| WO | WO 98/11703 | 3/1998 |
| WO | WO 98/37665 | 8/1998 |
| WO | WO 98/52371 | 11/1998 |

OTHER PUBLICATIONS

Wang et al. "Wireless Voice–over–IP and Implications for Third–Generation Network Design" Bell Labs Technical Journal, Jul.–Sep. 1998, pp. 79–97.

Foo et al. "A telephone adapter for Internet telephony systems" Microprocessors and Microsystems 21:213–221 (1997).

European Search Report EP 99 11 3316, completed Dec. 20, 1999.

* cited by examiner

*Primary Examiner*—Seema S. Rao
*Assistant Examiner*—Kevin C. Harper

(57) ABSTRACT

A system for enabling voice communications outside a LAN telephone network to be accomplished by way of a wireless interface formed from a standard wireless telephone, such as a cellular telephone, and an adapter. The adapter is configured to interface a standard wireless telephone to the communication network, such that the wireless telephone may be used as the wireless trunk. In particular, a network user may originate a call intended for someone outside the network and the call will be routed to its destination over the wireless telephone network, via the wireless telephone. The network and the adapter communicate with each other using standard network signaling protocols. Likewise, communication between the adapter and the wireless telephone is performed using known cellular signaling protocols. The adapter functions as a protocol converter to translate between the network signalling and wireless telephone signalling.

18 Claims, 7 Drawing Sheets

APPARATUS AND METHOD FOR ACCESSING WIRELESS TRUNKS ON A COMMUNICATIONS NETWORK

BACKGROUND OF THE INVENTION

1. Field of the Invention

The present invention generally relates to a system that allows voice communications over a LAN network and, more particularly, to a wireless trunk that enables voice over LAN communications outside the LAN network by way of a wireless interface formed from a standard wireless telephone, such as a cellular telephone, and an adapter.

2. Description of the Prior Art

Packet based communications networks have been in use for many years. However, a relatively new feature in such networks is telephony over local area network (LAN) systems. In particular, a network user is able to pick up a telephone connected to the LAN and complete a call to a destination user who is connected to either the same or a different network server, without using the public switched telephone network. This is accomplished by converting voice received from the telephone handset into packet data and sending the packets over the local area network to the destination caller. The packet data is then converted back into voice at the destination such that a user may listen on a telephone handset.

Currently, in order to place a call to a telephone user not connected to the network, the call is automatically routed to a public switched telephone network from where the call is completed to the destination telephone. This requires the network to be hardwired to a land-line based external trunk which is routed through a telephone company central office. Use of external hardwired trunks is known to have several drawbacks including the requirement that land-lines be available even in remote areas. Also, in emergency situations, when a land-line based trunk fails, or there is a failure in the public network, callers may be unable to dial out from the network. Thus, there is a need for a wireless trunk for use with telephony over LAN networks.

SUMMARY OF THE INVENTION

Briefly, the present invention relates to a system that enables voice over LAN communications outside a LAN telephone network to be accomplished by way of a wireless interface formed from a standard wireless telephone, such as a cellular telephone, and an adapter. The adapter is configured to interface the wireless telephone to the communication network, such that the wireless telephone may be used as the wireless trunk. In operation, a network based user initiates a call intended for someone outside the network and the call is routed to its destination over the wireless telephone network, via the wireless telephone. The network and the adapter communicate with each other using standard network signaling protocols. Likewise, the adapter and the wireless telephone communicate with each other using known cellular signaling protocols. The adapter functions as a protocol converter or translator to translate between the network signalling and wireless telephone signalling commands.

In accordance with one aspect of the invention, the adapter enables seamless communication between the network, such as a LAN, and a wireless communications network via the wireless telephone. As such, the wireless telephone provides wireless trunk capabilities to telephone calls that originate on the LAN but are destined for recipients not connected to it. In a particular embodiment of the invention, the adapter, which is interfaced to the LAN, is placed in a housing constructed such that a connector on the adapter automatically plugs into an interface connector in the wireless telephone when the telephone is inserted into the adapter. The adapter, through the interface connector, is then able to translate signals between the cellular telephone and the LAN such that the voice may be transferred from the LAN to the cellular telephone network and vice versa. In another embodiment of the invention, the adapter is housed in a standalone enclosure that may be wired in-between the wireless telephone and an interface for the LAN.

These and other advantages of the present invention will be readily understood with reference to the following specification and attached drawings wherein:

DETAILED DESCRIPTION OF SPECIFIC EMBODIMENTS OF THE INVENTION

The present invention relates to a system that enables voice over LAN communications outside a LAN based telephone network by way of a wireless interface formed from a standard wireless telephone, such as a cellular telephone, and an adapter. As will be discussed in more detail below, the wireless telephone adapter is adapted to receive a wireless telephone for interfacing to the LAN. The wireless telephone may be a cellular, GSM, PCS or other satellite based telephone. In accordance with an important aspect of an embodiment of the invention, the adapter may be addressed like any other device on the LAN, thereby eliminating the requirement for custom software. In addition, the adapter is able to translate LAN signaling to cellular signaling and vice versa, thereby enabling communications between the LAN and the wireless telephone. In the present invention, a LAN system configured using the H.323 protocol is shown and described. It is to be understood that the present invention may be used with a variety of different network protocols.

Figure 2:
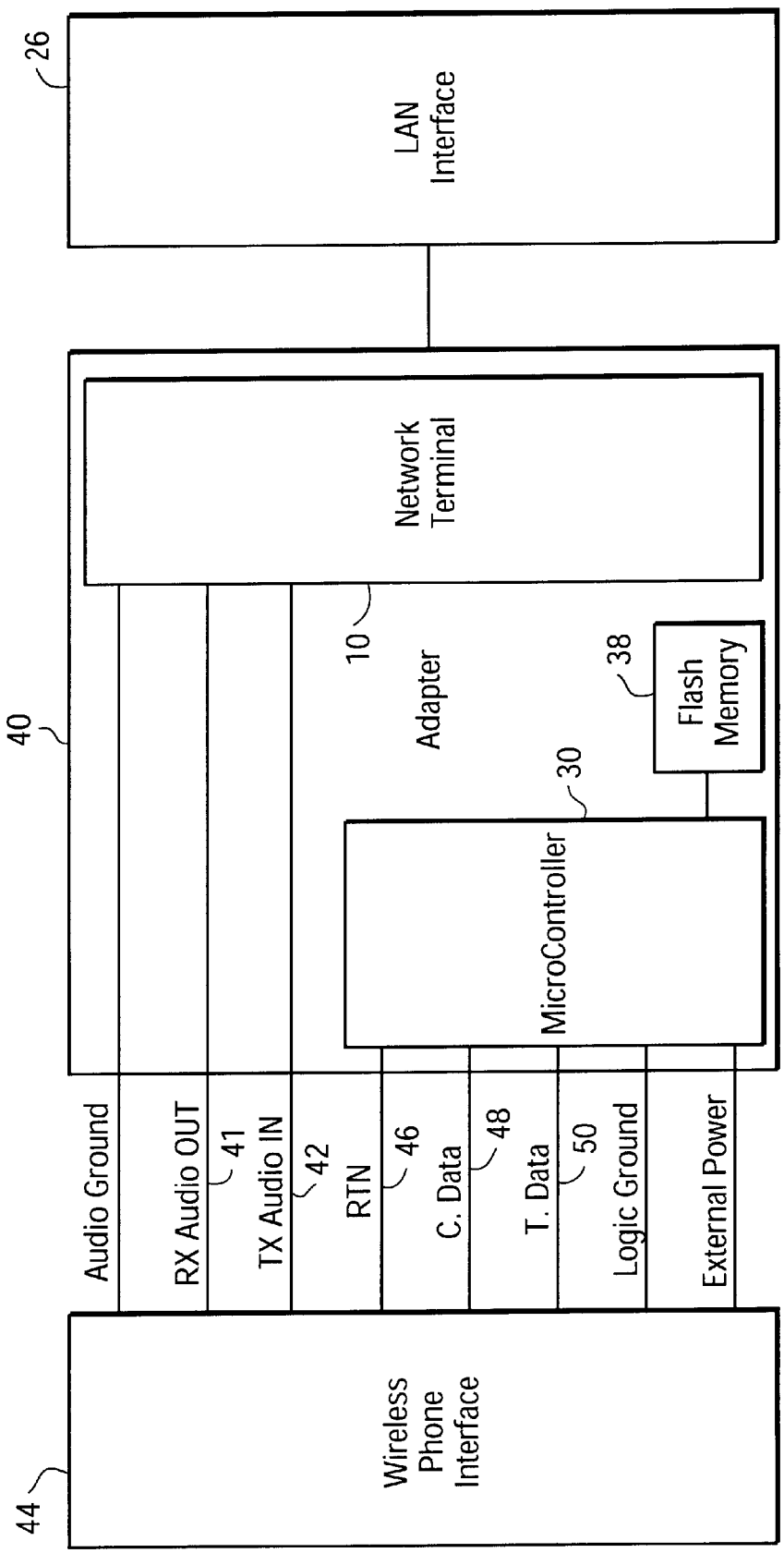
FIG. 2 is a schematic diagram of the adapter serving as an interface between the wireless telephone and the LAN, according to a specific embodiment.
Figure 3:
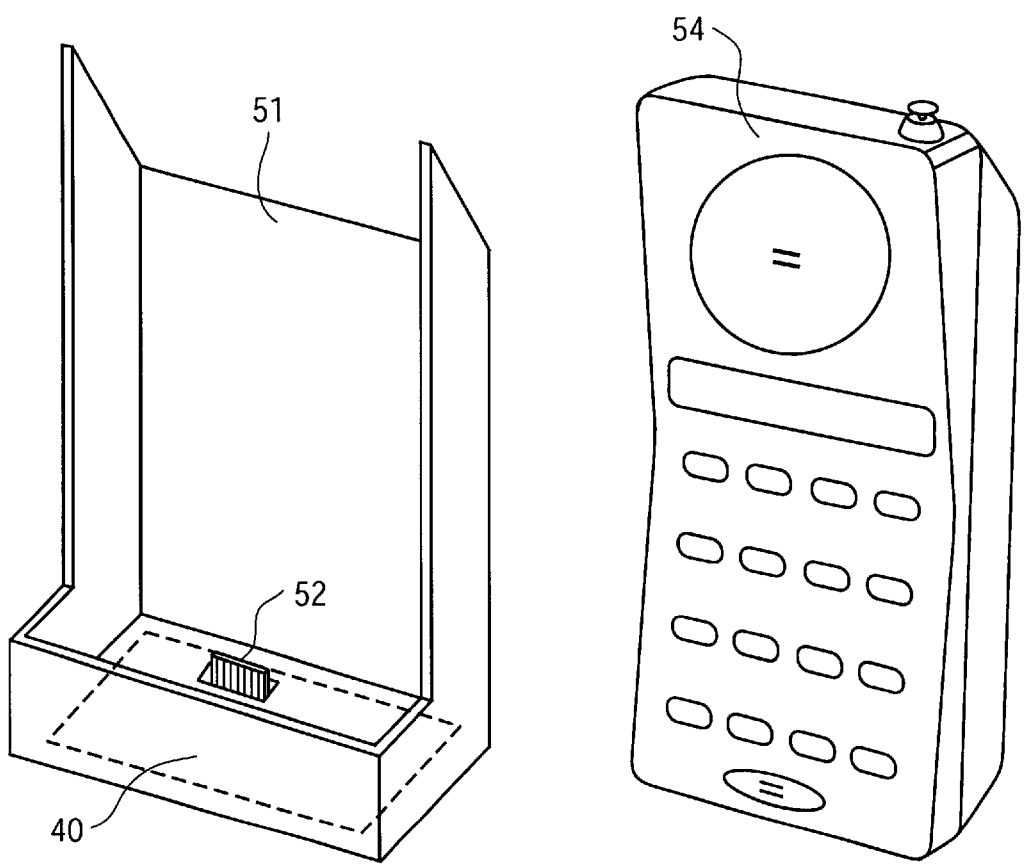
FIG. 3 is a diagram of an adapter housing adapted to accept a wireless telephone for insertion, according to a specific embodiment.
Figure 4:
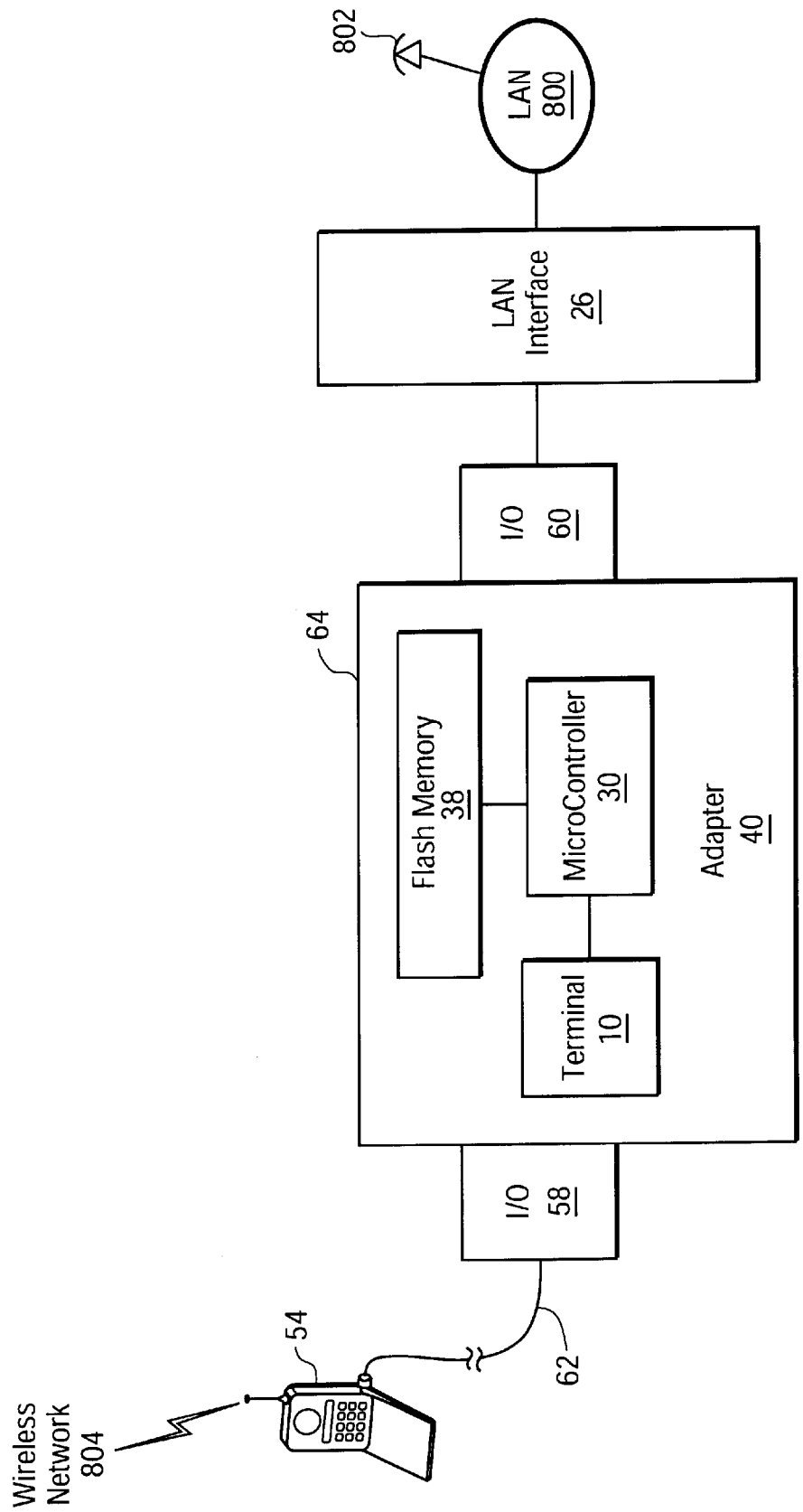
FIG. 4 is a diagram of an alternate embodiment of the adapter housing.

An embodiment of the invention is shown in FIG. 2. In particular, FIG. 2 illustrates the signal connections that the adapter uses to electrically interface the wireless telephone to a LAN through a LAN interface. FIG. 3 illustrates an exemplary physical embodiment of the adapter into which a wireless telephone may be inserted. FIG. 4 illustrates an alternate embodiment of the adapter.

Figure 1:
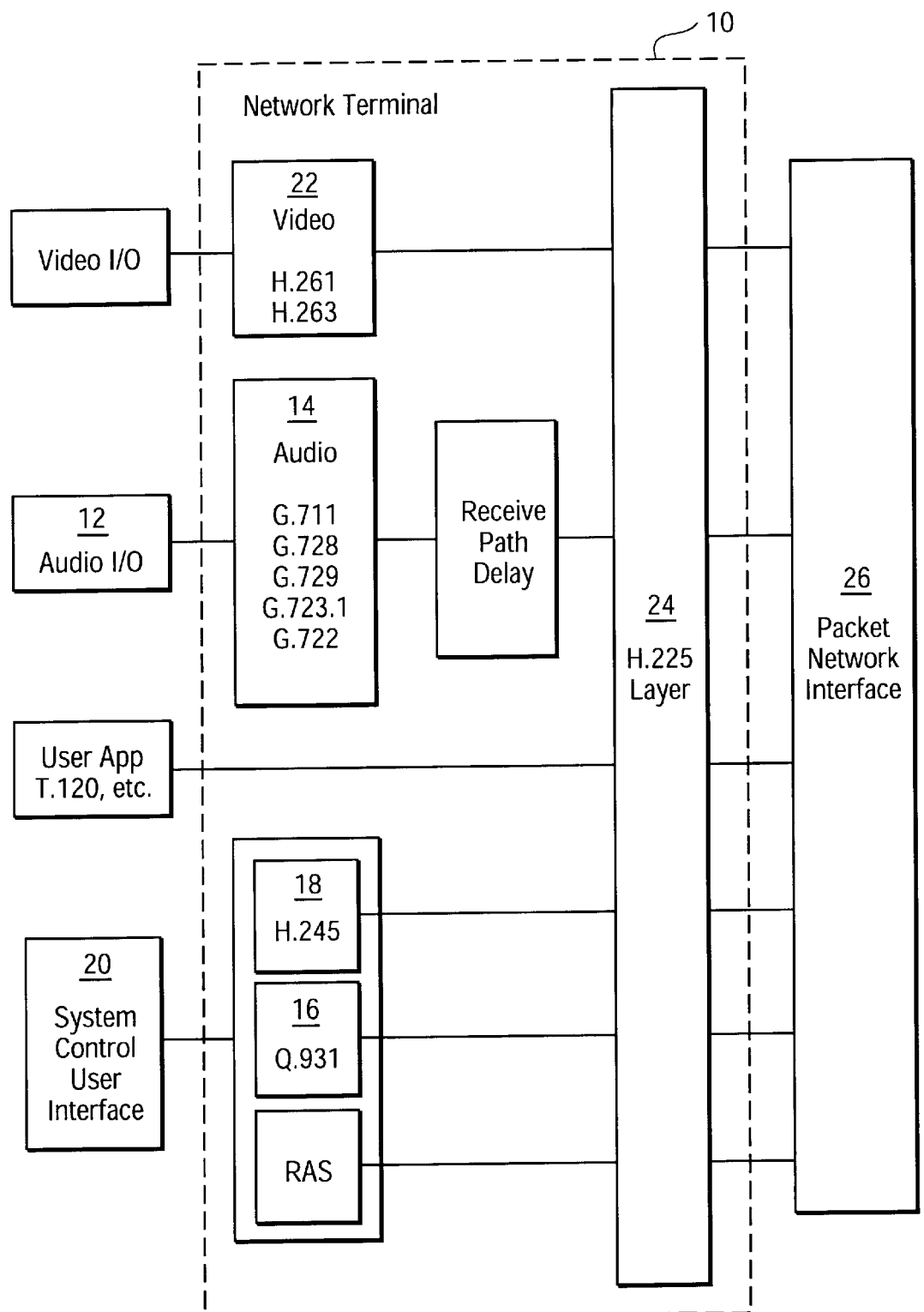
FIG. 1 is a schematic diagram of a known H.323 terminal connected to a packet based LAN.

For a better understanding of the invention, FIG. 1 illustrates a local area network (LAN) interface 26, connected to a known network terminal or device 10 utilizing the International Telecommunication Union (ITU-T) H.323 standard protocol, which is hereby incorporated by reference. Note that other networking protocols may also be used in other embodiments. The network terminal 10 includes, among other things, an audio coder/decoder (codec) 14 connected to an Audio(input/output) I/O interface 12, and a Q.931 specification based protocol 16, including an H.245 layer 18, connected to a System Control User Interface (SCUI) 20. H.323 terminals and equipment carry real-time voice, video and/or data. It should be noted that H.323 is an umbrella recommendation that sets standards for multimedia communications, including telephony over LANs. These networks include packet-switched TCP/IP and IPX over Ethernet, Fast Ethernet and Token Ring Networks. For purposes of the present invention, only the Audio I/O and the SCUI standards will be further described, as these are the interfaces used in operation of the present invention in a voice network environment. It should be noted, however, that the Video I/O interface 22 and related codecs may be used in video applications in a manner similar to that described below for audio applications.

As shown in FIG. 1, the Audio I/O interface 12, which may be part of a standard H.323 terminal, connects to the audio codec 14, such as a G.711 codec, for encoding and decoding audio signals. Although the G.711 codec is the mandatory audio codec for an H.323 terminal, other audio codecs, such as G.728, G.729, etc. may also be used for encoding and decoding speech. G.723 is a preferred codec because of its reasonably low bit rate, which enables preservation of link bandwidth, particularly in slower speed network connections.

The SCUI 20 provides signaling and flow control for proper operation of the H.323 terminal. The SCUI 20 encompasses the H.245 standard 18, which is the media control protocol that allows capability exchange, channel negotiation, switching of media modes and other miscellaneous commands and indications. The H.225 standard layer 24, which is derived from the Q.931 standard 16, is the protocol for establishing connection between two or more terminals and also formats the transmitted video, audio, data and control streams into messages for output to the network interface. The H.225 layer 24 also retrieves the received video, audio, data and control streams from messages that have been input from the network interface. Thus, an H.323 network may be configured to include several different devices. For example, the network may include a terminal for enabling users connected to a LAN to speak, a terminal for enabling a caller resident on the LAN to call a second user through the public switched network and/or a terminal for enabling the adapter to communicate through a wireless trunk, using a wireless telephone.

Referring to FIG. 2, a schematic diagram of an adapter 40 incorporating the H.323 standard is shown in accordance with one embodiment of the invention. The adapter 40 is configured to connect the LAN interface 26 to the wireless telephone interface 44. The internal circuitry of the wireless telephone includes interconnections to allow external extension electronics, such as the adapter 40, to be connected to the wireless telephone. A description of such an arrangement is described in U.S. Pat. No. 5,517,683, entitled "CONFORMANT COMPACT PORTABLE CELLULAR PHONE CASE SYSTEM AND CONNECTOR", issued to Collet et al., which is hereby incorporated by reference. The LAN interface 26 couples operationally to a LAN and one or more telephones coupled to the LAN.

The adapter 40 includes a microcontroller 30, flash memory 38 and the H.323 compliant Audio I/O and SCUI interfaces 12,20. The Audio I/O interface 12 is connected to the Receive Audio Out (RX) and Transmit Audio In (TX) wires 41,42 of the wireless telephone interface 44 to directly receive and transmit audio, respectively. The remaining signals, including RTN 46, C. Data 48 and T. Data 50, are all connected to the interface 20 SCUI via the microcontroller 30. In particular, the C. Data line 48 provides communication data, the T. Data line 50 provides complementary communication data and the RTN line 46 provides return data. The data lines are used by the adapter 40 to transmit converted H.323 commands from the LAN interface 26 to the wireless telephone or to transmit converted cellular messages from the wireless telephone to the LAN interface 26. Flash memory 38 may be used to store firmware used for converting between wireless telephone and network signalling protocols.

The microcontroller 30 translates H.323 signals, commands and data received from the LAN interface 26 into wireless telephone signals. Such signals may include call setup and call progress messages. For example, a lookup table (not shown) may be stored in the flash memory 38 to provide wireless telephone signal outputs that correspond to the H.323 signal inputs. Thus, the adapter 40 enables the LAN interface 26 to communicate with the wireless telephone through the wireless telephone interface 44. In addition, the microcontroller 30 also translates received wireless telephone control and status signals into H.323 compliant signals and commands to enable communication from the wireless trunk to the LAN interface 26. The lookup table, as described above, may also be used to provide H.323 signal outputs that correspond to wireless telephone signal inputs.

The microcontroller 30 is not required for the audio signals. In particular, audio that originates from the LAN interface 26 is directly passed from the Audio I/O interface 12 to the microphone or TX wire 42 of the interface 44. Similarly, audio that originates from the wireless network is directly passed to the Audio I/O interface 12 from the speaker or RX wire 41 of the wireless telephone interface 44. In both cases, the audio codec 14 is responsible for converting audio between analog voice signals that are input into the cellular phone for use on the wireless network, and data packets for use by the network. An optional DSP (not shown) may be provided to analyze the type of audio received from the wireless network. In particular, once the cellular telephone connects to the public switched telephone network (PSTN), the DSP may be used to determine whether a ring, busy, fast busy or other signal is being received from the wireless network. Based on the signal received, the system may choose to terminate the call or connect the call. For example, once the system determines that a ring signal is being received, the DSP will send a message to the H.323 network. Accordingly, the network may choose to connect the call to the network caller so that the caller may speak to the called party once the call is answered. However, if a busy signal is received, the system may be programmed such that the call attempt is reinitiated or terminated. Notification to the caller may be optional.

In operation, the audio provided by a first H.323 compliant terminal, which includes the Audio I/O and SCUI interface 12, 14, is transmitted over the LAN interface 42 in the form of packetized data to a second H.323 compliant terminal or device. There, the second terminal or device receives the packetized SCUI commands and audio and decodes the audio using its audio codec 14. Thus, a user at the second terminal is able to listen to the original audio. Alternatively, the audio may be decoded and sent through the public telephone network or the wireless telephone network to users not connected on the LAN. It should be understood that a wireless network may also include both analog and digital networks and PCS, GSM and satellite based networks.

Referring to FIG. 3, an adapter housing in accordance with an embodiment of the invention is illustrated and generally identified with the reference numeral 50. The adapter housing 50, in a particular embodiment of the invention, may be formed of any stiff non-conducting materials, such as plastic or wood, for housing the adapter. The adapter housing 50 desirably includes a built-in connector 52 for engaging an corresponding connector (not shown) on a wireless telephone 54, such as the Star-Tac manufactured by Motorola Inc. of Schaumburg, Ill., among others. The adapter connector 52 is designed such that it will connect directly to the connector on the bottom of the wireless telephone 54 when the telephone is inserted into the adaptor housing 51. A LAN network connector (not shown) is used to connect the adapter housing 51, including Audio I/O interface and the SCUI interface, to the LAN.

It should be noted that the adapter housing is not required to include the built-in connecter 52. Thus, referring to FIG. 4, in a second embodiment of an adapter housing, in accordance with the invention, the adapter 40 may be placed in an enclosure 64 for housing the adapter 40 along with input and output (I/O) ports 58, 60. The I/O port 58, for example, may be configured to receive a flexible connector 62 to interface the wireless telephone 54 to the adapter 40. The wiring connections would be similar to those discussed above (FIG. 2). Similarly, the I/O port 60 could be configured to receive a network connector 66 from the LAN interface 26, also as discussed above. Again, the LAN interface 26 couples operationally to LAN 800 and one or more telephones 802. The wireless telephone 54 communicates over a wireless network 804.

Figure 5A:
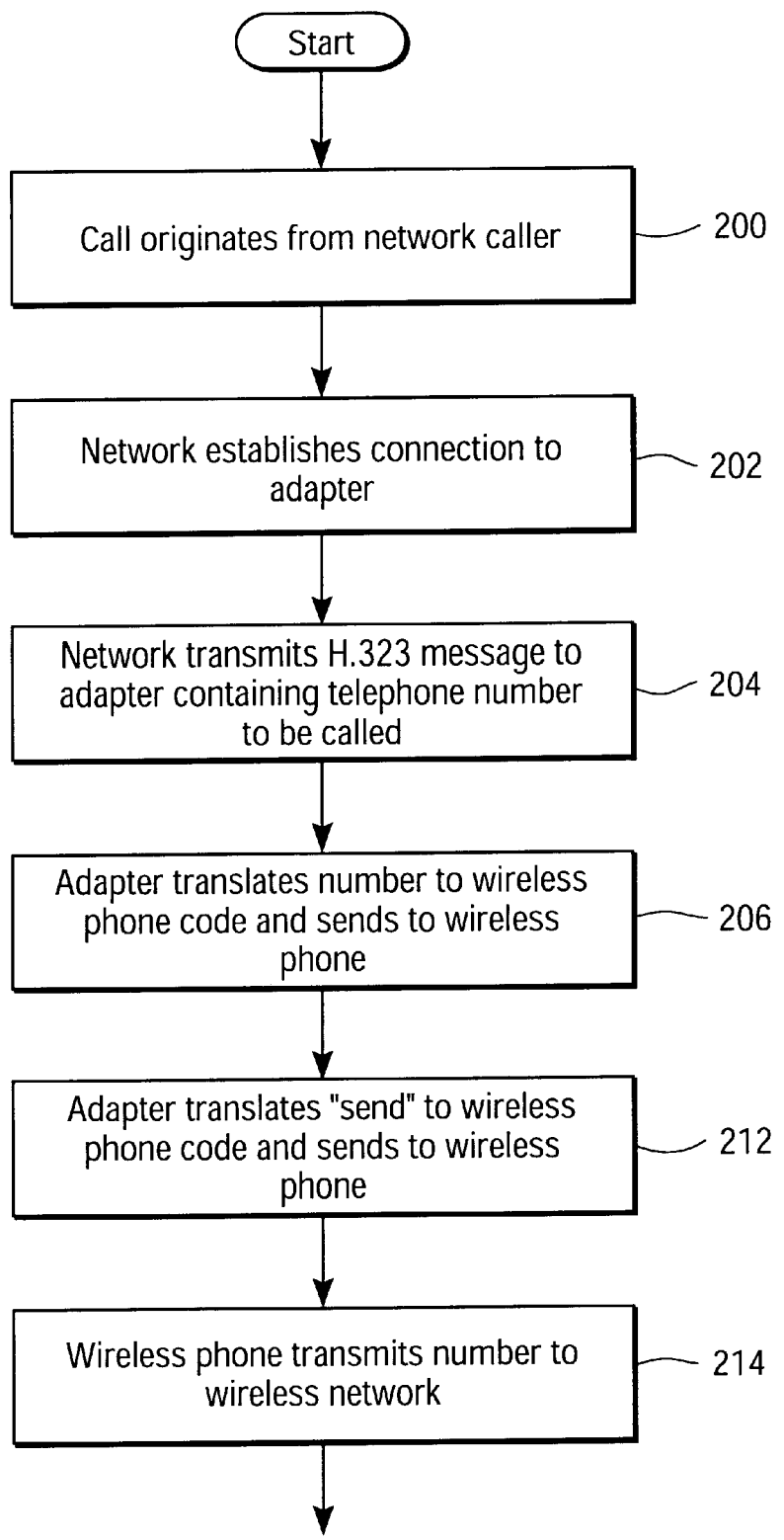
FIGS. 5A and 5B are flow diagrams of the present system in operation in accordance with a specific embodiment of the present invention.
Figure 5B:
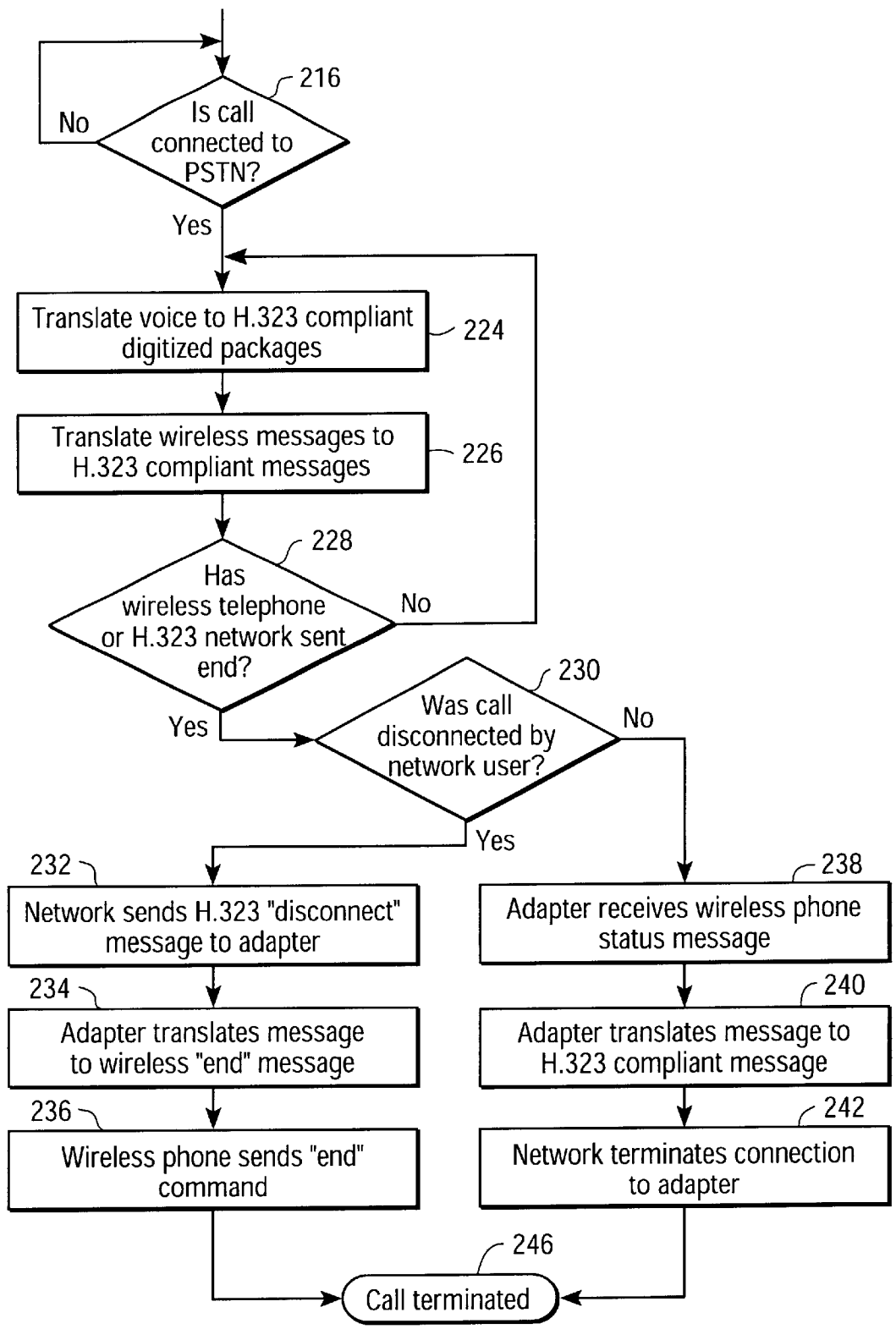

Referring to FIGS. 5A, 5B, a specific embodiment of the present invention is shown in operation. In particular, in step 200, a user resident on the LAN originates a telephone call from the LAN using an H.323 compliant telephony over LAN (ToL) system. As mentioned above, the adapter may be addressed like any other H.323 compliant terminal, as described in the ITU H.323 specification to establish a connection in step 202. Furthermore, all non-audio control signalling is handled by the SCUI. In step 204, the network transmits an H.323 message addressed to the adapter which includes the telephone number to be called to the adapter. The adapter, in step 206, translates the number into wireless telephone signaling commands and forwards the number to the wireless telephone. The adapter translates a cellular "send" command into a wireless telephone signaling command and forwards the command to the wireless phone, in step 212. In step 214, the wireless telephone transmits the number and attempts to establish a call to the destination number through the connection to the wireless telephone network. In step 216, the system determines whether the call is connected to the PSTN by monitoring the messages received by the adaptor from the wireless telephone and which are subsequently sent to the network. If the call is not connected, then the system returns to step 216. The system may be programmed to time out such that after a predetermined amount time, if the call remains unconnected, the call attempt will be aborted.

However, if it is determined in step 216 that the call was successfully connected to the destination number, (if the call is connected, then an H.323 call connect signal is sent indicating that a connection to the PSTN has been established), then in step 224, the audio codec of the audio I/O in the adapter translates the voice signals received from the wireless telephone speaker into H.323 compliant digitized packages and/or translates H.323 digitized packages received from the network into voice signals. In step 226, any wireless telephone messages received by the adapter are translated into H.323 compliant messages. In step 228, the system checks for call progress messages to determine whether the wireless telephone or the H.323 network sent an end message. If the call is not terminated, then the system returns to step 224. However, if the call is terminated, then in step 230, the system determines whether the call was terminated by the network originating caller or the wireless network caller. If the call was terminated by the network originating caller, then in step 232, the network sends an H.323 "disconnect" message to the adapter. The adapter, in step 234, translates the message to a wireless telephone end message. In step 236, the adaptor sends the wireless phone the end command. This results in the wireless telephone terminating the call in step 246. However, if the call was not disconnected by the call originator, then in step 238, the adapter receives a wireless telephone status message indicating that the call was disconnected. In step 240, the adapter translates the message to an H.323 compliant message then in step 242 transmits the message to the network to cause the network to terminate the connections to the adaptor to then terminate the call in step 246.

Figure 6:
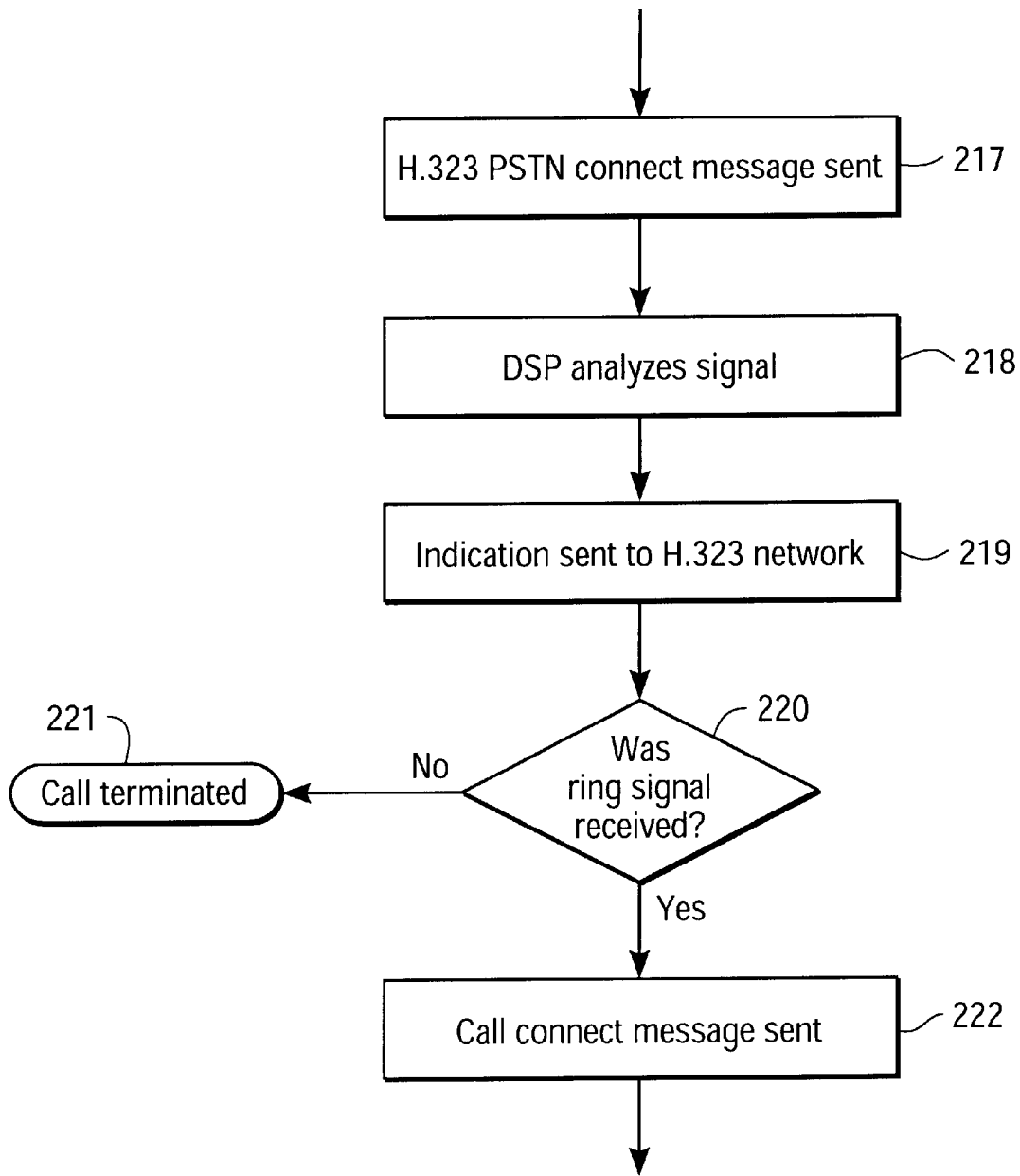
FIG. 6 is a flow diagram of the present system in operation in accordance with an optional embodiment of the present invention.

Referring to FIG. 6, an embodiment of the invention is shown in operation wherein the optional DSP is incorporated. In particular, after step 216 above, the adapter, in step 217, sends a message indicating that the wireless network is connected to the PSTN. In step 218, the DSP analyzes the signal to determine whether a ring, busy, fast busy or other type of signal is being received from the PSTN. The indication of the type of signal being received is then sent to the network in step 219. In step 220, the network determines whether a ring signal was received. If not, the call may be terminated in step 221. If so, a call connect message is sent in step 222. The system then continues to step 224, as discussed above.

What is claimed is:

1. A communications system for transmitting voice communications over a computer network to a user outside said computer network, comprising:

a local area network;

a telephone connected to said local area network;

a wireless communications device adapted to communicate with a wireless communications network; and an adapter configured to provide a signaling interface to enable voice originating from said telephone to be transferred from said local area network to said wireless communications network using said wireless communications device wherein said wireless communications device includes a wireless telephone.

2. The communications system of claim 1, wherein said wireless telephone is a cellular telephone.

3. The communications system of claim 1, wherein said wireless communications network is analog.

4. The communications system of claim 1, wherein said wireless communications network is digital.

5. The communications system of claim 1, wherein said wireless communications network is GSM.

6. The communications system of claim 1, wherein said wireless communications network is PCS.

7. The communications system of claim 1, wherein said wireless communications network is satellite based.

8. The communications system of claim 1, wherein said computer network is H.323 compliant.

9. The communications system of claim 1, wherein said adaptor includes a connector configured to connect said wireless communications device to said adaptor.

10. The communications system of claim 9, wherein said connector includes a Motorola connector.

11. A method in a computer network for connecting a wireless trunk to said computer network, comprising:

communicating with a wireless communications network using a wireless communications device, said wireless communication device including a wireless telephone;

connecting said communications device to said computer network; and translating signals between said wireless communications device and said computer network to enable computer network data to be transmitted and received over said wireless communications network;

wherein said computer network data includes voice communication from said computer network.

12. A method in a computer network for connecting a wireless trunk to a computer voice network, comprising:

communicating with a wireless communications network using a wireless communications device, said wireless communication device including a wireless telephone;

connecting said wireless communications device to said computer voice network via a signal adapter; and translating signals between said wireless communications device and said computer voice network via said signal adapter to enable computer network data to be transmitted and received over said wireless communications network.

13. The method of claim 12 wherein said computer network is H.323 compliant.

14. A wireless telephone adapter for enabling a standard wireless telephone to provide wireless trunk capabilities to a computer network, comprising a wireless telephone configured to communicate with a wireless communications network, said wireless telephone including an external connector; and an adapter having an external connector configured to be electrically connected to said wireless communications device, said adapter configured to provide a control signal interface between said wireless communications network and said computer network, said adapter including means for translating communications signals between said wireless telephone and said computer network to enable voice communications from said computer network to be transmitted and received over said wireless communications network.

15. The wireless telephone adaptor of claim 14 wherein said external connection is removably attachable to said adaptor.

16. The wireless telephone adapter of claim 14, wherein said adapter includes means for translating wireless signalling to communications network signalling and vice-versa.

17. The wireless telephone adapter of claim 16, wherein said translating means includes means for converting LAN call setup messages to wireless telephone call setup messages.

18. The wireless telephone adapter of claim 16, wherein said translating means includes means for converting LAN call progress messages to wireless telephone call progress messages.

* * * * *